UNITED STATES PATENT OFFICE.

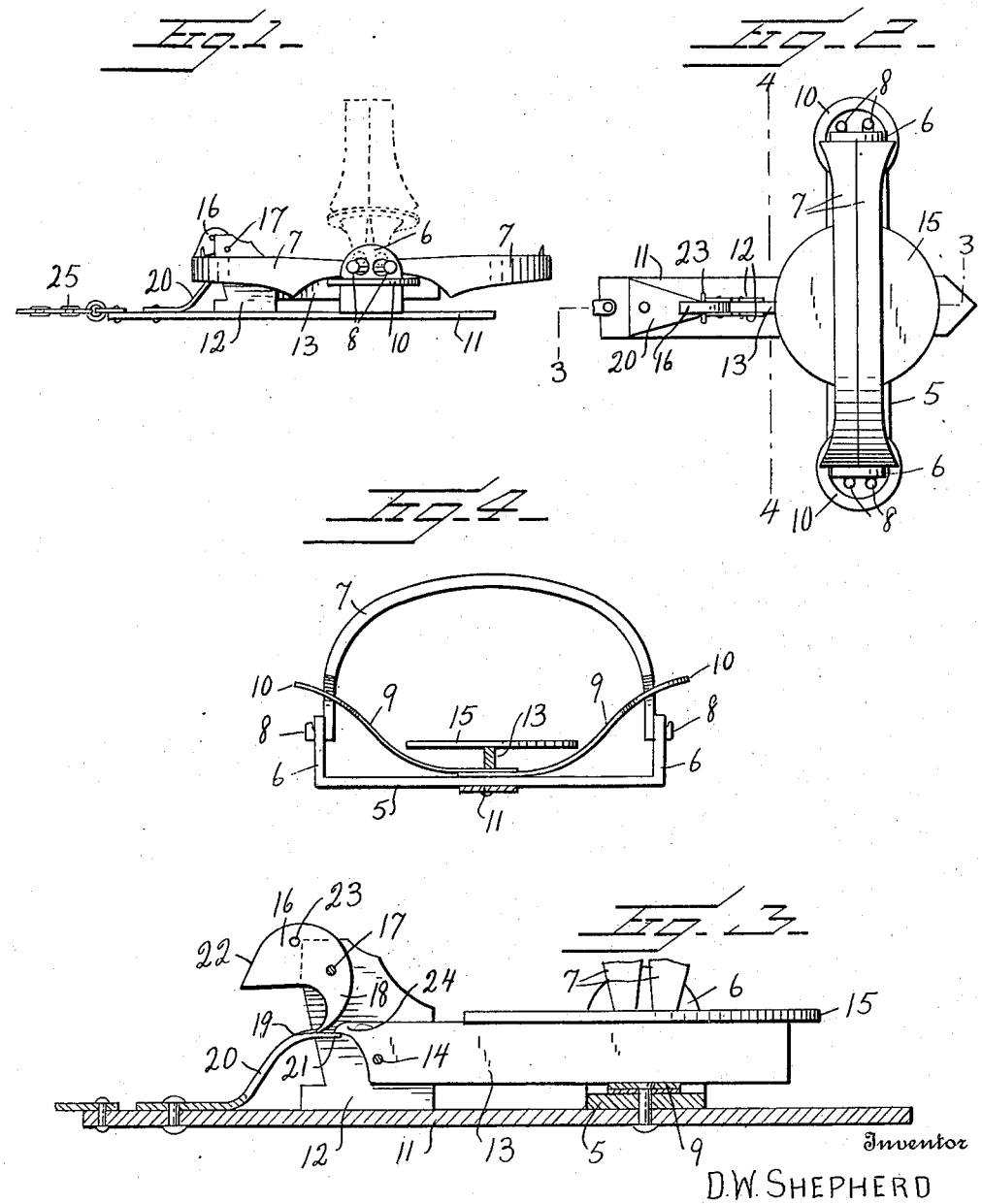

DANIEL W. SHEPHERD, OF RUPERT, IDAHO, ASSIGNOR OF ONE-HALF TO GEORGE B. MONTGOMERY, OF RUPERT, IDAHO.

ANIMAL-TRAP.

1,201,368. Specification of Letters Patent. Patented Oct. 17, 1916.

Application filed February 16, 1916. Serial No. 78,694.

*To all whom it may concern:*

Be it known that I, DANIEL W. SHEPHERD, a citizen of the United States, residing at Rupert, in the county of Minidoka and State of Idaho, have invented certain new and useful Improvements in Animal-Traps, of which the following is a specification, reference being had to the accompanying drawings.

This invention relates to animal traps and has for its primary object to provide a trap primarily designed for the trapping of predatory animals such as coyotes, lynx, pole cats, fox, etc., which will be positive and reliable in its action, and from which the animal cannot effect its escape.

It is a more particular object of the present invention to provide a trigger operated latch device which will positively hold the jaws in open position but at the same time will be highly sensitive in its action and immediately release the jaws when the bait is pulled by the animal.

It is a further general object of the invention to produce a trap for the above purpose, which is very simple in its construction, not liable to get out of order, and extremely strong and durable.

With the above and other objects in view, my invention consists in the novel features of construction, combination and arrangement of parts to be hereinafter more fully described, claimed and illustrated in the accompanying drawing, in which, Figure 1 is a side elevation of a trap constructed in accordance with the preferred embodiment of my invention, showing the jaws in full lines in their set or open positions and in dotted lines in their closed position; Fig. 2 is a top plan view; Fig. 3 is an enlarged vertical section taken on the line 3—3 of Fig. 2; and Fig. 4 is a section taken on the line 4—4 of Fig. 2.

Referring in detail to the drawing, 5 designates the base bar of the trap which is provided upon its opposite ends with the upstanding ears 6. The jaws 7 which are of substantially semi-circular form, are each provided with outwardly projecting trunnions 8 on their ends which are pivotally engaged in the respective ears 6, as clearly shown in Fig. 1. These jaws may be provided upon their opposing edges with suitable teeth to penetrate the body or head of the animal so as to occasion immediate death when the trap is sprung.

To the center of the base bar 5 and on its upper face, the inner ends of the jaw actuating spring plates 9 are securely bolted or otherwise fixed. The outer ends of these jaws are formed with transversely elongated loops, indicated at 10, through which the corresponding extremities of the jaws 7 extend. The spring plates 9 normally extend upwardly at an angle so that the terminal loops 10 thereof engage upon the jaws at some distance above their pivots 8 and thus serve to yieldingly hold the jaws in their closed positions in contact with each other, as shown in dotted lines in Fig. 1. A second base bar 11 extends under the bar 5 at right angles thereto, said bars being securely fixed to each other. It will be noted that the bar 11 projects to an appreciably greater extent from one side of the bar 5 than it does from the other side of said bar. Upon the longer projecting end portion of the bar 11, spaced supporting plates 12 are securely fixed. Between these plates, one end of a trigger arm 13 is fulcrumed upon a pivot pin 14 which is fixed in the frame plates 12. The trigger arm 13 rests at its other end upon the base bar 5 and to the upper edge of this trigger arm a circular bait plate 15 is suitably secured. A latch dog 16 is pivotally mounted, as at 17, between the upper ends of the spaced frame plates 12 and the pivoted end of this dog is attenuated and outwardly curved, as indicated at 18, the terminal point of said curved end of the dog being adapted for engagement against a shoulder 19 formed on the upper face of a leaf spring 20 adjacent the free end thereof. The terminal portion of this spring beyond the shoulder 19, normally extends inwardly between the spaced plates 12, as shown at 21. The spring 20 is fixed at its outer end to the base bar 11 and gradually tapers in width from this fixed end to its terminal 21. The body portion of the latch dog 16 projects outwardly from the frame plates 12 and the outer edge thereof is obliquely inclined, as at 22, and gradually merges into the upper curved edge of said dog. Over these curved and inclined edges of the dog, one of the jaws 17 is adapted to ride when moved to its open position so that the jaw will act upon the dog to force the other end 18 thereof inwardly beyond the shoulder 19 on the latch spring. In the body of the dog, the transversely disposed stop pin 23 is fixed which is adapted for engagement with the edges of the plates 12 and limits the rocking or pivotal movement of the latch dog in either direction. The pivoted end of the trigger arm 13 is formed with a lug or extension 24 which, when the locking dog 22 is in its set position, projects over the terminal 21 of the latch spring 20. To the end of the base bar 11, one end of a chain 25 may be suitably connected, whereby the trap can be anchored or tied to a tree or other stationary object.

In the use of the trap, the bait is tied upon the bait plate 15 and the jaws 7 are forced apart outwardly and downwardly to their open positions. In the downward movement of the jaws, the ends of the spring plates 9 are also forced downwardly and placed under compression. The medial portion of one of the jaws 7 rides over the outwardly projecting end of the latch dog 16 as above explained, so that the inner end 18 of the dog will force the free end of the latch spring 20 downwardly between the frame plates 12 and engage with the shoulder 19 of said spring. This latch spring is held under compression by the extension 24 of the trigger arm which engages upon the free end thereof. It is thus apparent that when the animal attempts to remove the bait from the plate 15 and pulls or tugs upwardly thereon, he will lift the inner end of the trigger arm 13 so that the extension 24 thereof will exert a downward pressure upon the terminal 21 of the latch spring, thus releasing the latch dog 16. The springs 9 will then immediately act upon the pivoted ends of the jaws 7 and instantaneously force said jaws upwardly and together so that the animal will be impaled between the jaws. In practically every case, the head of the animal will be caught between the jaws so that immediate death will take place and the animal will not suffer in lingering agony. It will be manifest that, as an upward pull upon the bait is necessary to spring the trap, the same will not be sprung by domestic stock stepping on the trigger arm or the bait plate, nor will freezing of the trigger interfere with the releasing action thereof upon the latch dog spring. In many jurisdictions, there are laws for the protection of birds such as eagles, sea gulls, etc. Birds of this species usually stand upon their food while eating it and with the old style trap, wherein the trigger arm or bait plate is pressed upon to spring the trap, many such birds are caught. With the present improved trap, however, this is impossible as the birds could not, of course, while standing upon the bait, exert a sufficient pull upon the same to operate the trigger arm. Predatory animals such as above referred to, are quite wary and it frequently happens that, with the old pressure operated trap, the bait will be removed or stolen by the animal without springing the trap. As the bait is securely tied or otherwise fastened by the bait plate, it will be manifest that by means of the present invention, the bait could not possibly be removed by the animal without releasing the trap jaws.

From the foregoing description, taken in connection with the accompanying drawing, the construction, manner of operation and several advantages of my invention will be clearly and fully understood. The device is simple, extremely strong and durable, and very positive and reliable in its action. The traps may, of course, be manufactured in various sizes for the trapping of different animals, and the form, proportion and arrangement of the several elements accordingly varied as special requirements may dictate. I therefore, reserve the privilege of adopting all such legitimate modifications as may be fairly embodied within the spirit and scope of the invention as claimed.

Having thus fully described my invention, what I desire to claim and secure by Letters Patent is:—

1. An animal trap including opposed spring closed jaws, a trigger arm pivotally mounted adjacent one of its ends, a bait plate fixed upon the trigger arm, a movable latch dog adapted to engage one of the trap jaws and hold the jaws in their set positions, and means coöperatively engaged with said dog to retain the same in its latching position, the pivoted end of said trigger arm also coöperating with said last named means when the trap is set to prevent action thereof but operating to release said means upon an upward pull on the bait whereby the trap is sprung.

2. An animal trap including opposed spring closed jaws, a trigger arm pivoted at one end and provided with means for securing a bait to its other end, a pivoted latch dog with which one jaw of the trap is adapted to be engaged, and a resilient element coöperatively engaged by the pivoted end of the trigger arm and one end of said latch dog and actuated by the trigger arm upon an upward pull upon the bait to release said element from coöperative engagement with the latch dog and permit the trap jaws to move to their closed positions.

3. In an animal trap, pivoted spring closed trap jaws, a trigger arm pivotally mounted at one end and provided with means for securing the bait on its other end, a pivoted latch dog with which one of the jaws is adapted to be engaged to hold the jaws in their set positions, a latch spring having a shoulder therein adapted to be engaged by one end of the dog to prevent pivotal movement thereof in one direction, the pivoted end of the trigger arm having an extension adapted to exert a downward pressure upon the free end of the spring when the bait is pulled upwardly and release the latch dog to permit the trap jaws to move to their closed positions.

4. In an animal trap, opposed pivotally mounted spring closed jaws, a trigger arm pivotally mounted at one end and having means for securing a bait to its other end, a pivoted latch dog with which one of the jaws is adapted to be engaged to hold the jaws in their set positions, a leaf spring fixed at one end and having a shoulder adjacent its other end for engagement by one end of the latch dog to limit the pivotal movement of the latch dog in one direction and hold the same in engagement with the trap jaw, said trigger arm being provided with a longitudinally projecting lug engaged upon the free end of the leaf spring and adapted to exert a downward pressure thereon when the bait is pulled upwardly to release said dog and permit the jaws to move to their closed positions.

In testimony whereof I hereunto affix my signature in the presence of two witnesses.

DANIEL W. SHEPHERD.

Witnesses:
E. R. DAMPIER,
MARJORIE WHITTLE.

Copies of this patent may be obtained for five cents each, by addressing the "Commissioner of Patents, Washington, D. C."